United States Patent [19]

Sugimoto et al.

[11] 4,090,748
[45] May 23, 1978

[54] DEVICE FOR LUBRICATING REAR BUSH IN EXTENSION HOUSING OF AUTOMOTIVE TRANSMISSION

[75] Inventors: Hiroshi Sugimoto, Aichi; Kazuyoshi Nishikawa, Toyota, both of Japan

[73] Assignee: Toyota Jidosha Kogyo Kabushiki Kaisha, Toyota, Japan

[21] Appl. No.: 717,666

[22] Filed: Aug. 25, 1976

[30] Foreign Application Priority Data

May 31, 1976 Japan .................. 51-63101

[51] Int. Cl.$^2$ ......................... F16C 1/24; F01M 1/00
[52] U.S. Cl. ...................................... 308/121; 74/467; 184/11 R; 308/98; 308/240
[58] Field of Search ...................... 308/78, 92, 93, 98, 308/106, 107, 114, 116, 121, 122, 123; 74/467; 184/11 R, 11 A, 11 B

[56] References Cited

U.S. PATENT DOCUMENTS

| | | | |
|---|---|---|---|
| 1,631,217 | 7/1927 | Mathews | 308/187 R |
| 1,919,522 | 7/1933 | Lipman | 308/98 |
| 2,654,441 | 10/1953 | Orr et al. | 308/121 |
| 2,718,270 | 9/1955 | Watts et al. | 308/98 |
| 2,762,233 | 9/1956 | Orr | 74/467 |
| 3,987,873 | 10/1976 | Ruberte | 74/467 |

FOREIGN PATENT DOCUMENTS 572,325 10/1945 United Kingdom ............ 308/187 R

Primary Examiner—Richard A. Bertsch
Attorney, Agent, or Firm—Cushman, Darby & Cushman

[57] ABSTRACT

The oil grooves which are formed in the bore of a hollow rear bushing that is disposed adjacent to the rear end of an extension housing of an automotive transmission are provided in such a pattern that upon rotation of the output shaft or sleeve journalled in the bore, lubricating oil is drawn into the grooves from both the front and rear ends of the bushing. The oil drawn in is distributed over the whole inner surface of the bore and discharged into the space behind the rear bushing. The extension housing is provided with a passageway which interconnects the space behind the rear bushing with the space ahead of the rear bushing.

6 Claims, 8 Drawing Figures

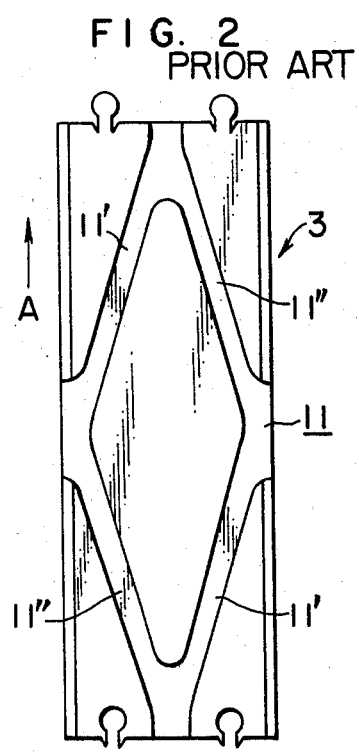
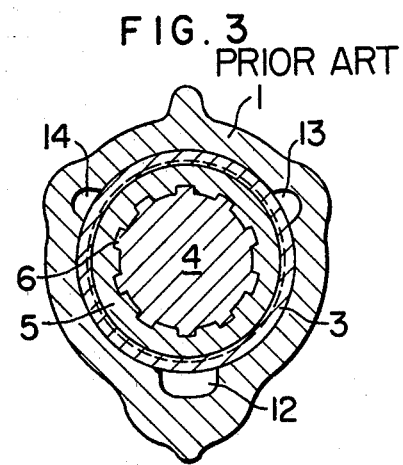
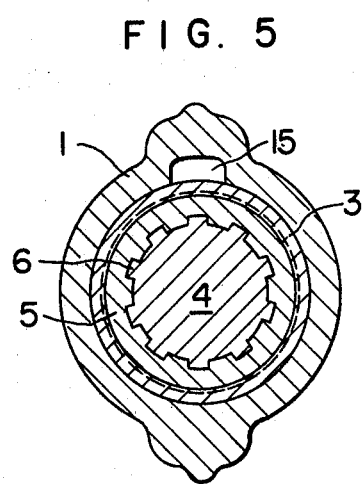

DEVICE FOR LUBRICATING REAR BUSH IN EXTENSION HOUSING OF AUTOMOTIVE TRANSMISSION

BACKGROUND OF THE INVENTION

The present invention relates to a system for lubricating a rear bush (i.e. a rear bushing) disposed adjacent the rear end of an extension housing of an automotive transmission for supporting an output shaft or sleeve yoke splined thereto.

In conventional automotive transmissions, an extension housing is extended rearwardly from a transmission case for supporting an output shaft or sleeve yoke splined thereto by a rear bush disposed adjacent the rear end of the extension housing. The extension housing contains oil for lubricating the rear bush. The rear bush is provided with oil grooves so that lubricating oil flows through the rear bush forwardly and backwardly under the screw pump action produced upon rotation of the output shaft or sleeve yoke in the rear bush, and a plurality of axially extended passages are formed in a rear bush retainer section of the extension housing for intercommunicating the front and rear spaces in front of and behind the rear bush so that sufficient lubricating oil may exist in the rear space as well as the front space.

In general, the automotive transmissions of the type described are mounted on vehicles of the front-engine and rear-drive type at an angle of 3° to 4° inclined rearwardly with respect to the horizontal because of the construction of the vehicles. Therefore the lubricating oil is filled into the extension housing in such a quantity that the inclined rear bush may be completely immersed with lubricating oil. In other words, the rear bush is below the level of the lubricating oil when a vehicle is traveling on a flat road or upgrade slope, but when the vehicle is traveling on a down-hill, the lubricating oil flows toward and remains on the side of the transmission case, leaving almost no lubricant in the rear bush so that seizure of the rear bush results.

The simplest solution for this problem is to increase the lubricating oil in the extension housing so that the rear bush may be kept immersed even during the down-hill traveling, but this method is not preferable because the transmission efficiency decreases with the increase in resistance encountered by the transmission gears from the increased lubricating oil and the power required for shifting the transmission is increased.

To overcome this problem there has been proposed and practised a method for disposing in the extension housing a weir extended upwardly from the bottom thereof so as to hold back the flow of the lubricating oil toward the transmission case during the down-hill traveling, thereby keeping the rear bush sufficiently immersed with the lubricating oil. However this method must be provided with means for trapping the lubricating oil splashed by the transmission gears and feeding the trapped oil to an oil sump defined by the weir. As a result, the parts required for the lubrication of the rear bush is increased in number, and the fabrication of the extension housings by die-casting becomes difficult because of the existence of the weir, thus resulting in the use of inefficient sandmolds with a complex pattern and the decrease in productivity.

SUMMARY OF THE INVENTION

The present invention was made to overcome the above problems, and has for its object to provide a device for lubricating a rear bush in an extension housing of an automotive transmission which device is very simple in construction yet capable of ensuring reliable lubrication of the rear bush with a small quantity of oil for a certain time interval even when most of the lubricating oil has flowed toward the transmission case during the down-hill traveling.

To the above and other ends, the present invention provides a rear bush lubrication device for use in an automotive transmission of the type in which a cylindrical hollow rear bush is disposed adjacent the rear end of an extension housing of the automotive transmission for rotatably supporting an output shaft or sleeve rotatable in unison therewith, oil grooves are formed on the inner surface of said rear bush in such a way that upon rotation of said output shaft, lubricating oil is drawn into said oil grooves from the front and rear ends of said rear bush to be uniformly distributed over the whole inner surface of said rear bush, and an axial passage or passages are formed in said extension housing for intercommunicating the front and rear spaces in front of and behind said rear bush, characterized in that said oil grooves are arranged in such a pattern that said lubricating oil can be discharged only into said rear space, and said axial passages for intercommunicating said front and rear spaces are formed only in a portion of said extension housing surrounding the upper portion of said rear bush.

According to the present invention, during the travel on a flat road or up-hill, the lubricating oil is drawn from the front space into the oil grooves of the rear bush so as to lubricate the rear bush and discharged into the rear space and the lubricating oil in the rear space is returned through the axial passage into the front space, and even when the lubricating oil flows away from the rear bush during the down-hill traveling, the satisfactory lubrication of the rear bush continues for a certain time until all the lubricating oil trapped in the rear space leaks through the clearance between the rear bush and the output shaft or sleeve splined thereto into the front space.

In view of actual road circumstances it is observed that the longest down-hill travel time is only 20 minutes at the most. The rear bush lubrication device in accordance with the present invention ensures the satisfactory lubrication of the rear bush for a down-hill travel time of the order of 20 minutes.

The above and other objects, features and advantages of the present invention will become more apparent from the following description of some preferred embodiments thereof taken in conjunction with the accompanying drawings.

BRIEF DESCRIPTION OF THE DRAWINGS

FIG. 2 is a developed view of a rear bush thereof illustrating an oil grooving pattern of the rear bush;

FIG. 3 is a sectional view taken along the line III—III of FIG. 1;

FIG. 5 is a sectional view taken along the line V—V of FIG. 4;

Same reference numerals are used to desingate similar parts throughout the figures.

DESCRIPTION OF THE PREFERRED EMBODIMENTS

Figure 1:
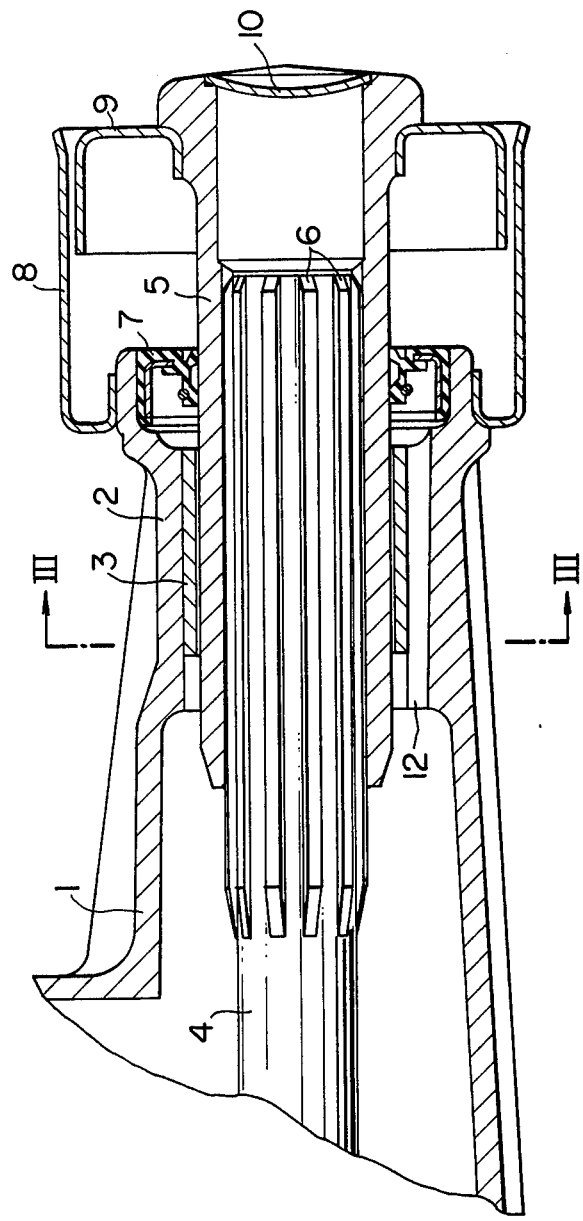
FIG. 1 is a fragmentary longitudinal sectional view of an extension housing of an automotive transmission incorporating a typical piror art rear bush lubrication system.

Prior Art, FIGS. 1, 2 and 3

Prior to the description of the preferred embodiments of the present invention, the prior art lubrication system for a rear bush in an extension housing of an automotive transmission will be briefly described to specially point out the problems thereof with reference to FIGS. 1 through 3.

FIG. 1 is a longitudinal sectional view of the prior art automotive transmission, illustrating mainly the construction thereof in the vicinity of a rear bush 3 force fitted into a cylindrical rear bush retainer section 2 of an extension housing 1. A sleeve yoke 5 is fitted over the rear portion of an output shaft 4 to be rotatably supported in the rear bush 2. The sleeve yoke 5 is splined at 6 to the output shaft for rotation therewith and axial movement therealong in order to absorb the axial movement of a propeller shaft (not shown) joined to the yoke 5. An oil seal 7 is placed at the rear end of the extension housing 1 to seal the yoke 5, and collars 8 and 9 are fitted over the extension housing 1 and the yoke 5, respectively, to prevent the intrusion of dust into the extension housing 1. The rear end opening of the sleeve yoke 5 is closed with a plug 10.

The rear bush 3 is formed into a cylindrical shape from a flat sheet with an oil grooving pattern 11 shown in FIG. 2 so that helical grooves 11' and 11" which have a pitch substantially equal to the length of the rear bush 3 and intersect with each other at the middle point between the ends of the rear bush 3 are provided. Three circumferentially spaced axial grooves 12, 13 and 14 are formed on the bore of the rear bush retainer section 2 as shown in FIG. 3 so as to provide passages axially extending along the outer periphery of the rear bush 3 and intercommunicating spaces in front of and behind the rear bush.

The transmission with the rear bush 3 is mounted on an automotive vehicle in such a manner as to be inclined rearwardly at an angle of 3° to 4° with respect the horizontal. When the vehicle is running on a flat road or upgrade slope, the level of lubricating oil within the extension housing 1 is high enough to immerse the rear bush 3, and lubricating oil flows through the axial passages 12, 13 and 14 to completely fill the space behind the rear bush 3 as well as the space in front of the rear bush 3. When the sleeve yoke 5 is rotating in the direction indicated by the arrow A in FIG. 2, the lubricating oil in the space in front of the rear bush (that is, on the left side in FIG. 2) is entrained or drawn into the helical groove 11' under the screw pump action of the sleeve yoke 5 and, after lubricating the rear bush, discharged into the space behind the rear bush 3 (that is, on the right side in FIG. 2). In like manner, the lubricating oil in the space behind the rear bush 3 is forced to flow through the helical oil groove 11" into the space in front of the rear bush 3. Therefore the sliding contact interface between the rear bush 3 and the sleeve yoke 5 may be completely lubricated with oil. However when the vehicle starts travelling on a down-hill, the lubricating oil flows toward the transmission case (that is, to the left side in FIG. 1) so that the rear bush 3 is exposed out of the level of lubricating oil and the lubricating oil in the space behind of the rear bush 3 flows through the axial passages 12, 13 and 14 into the space in front of the rear bush 3. As a result, the rear bush 3 is not supplied with lubricating oil, and the lubrication of the rear bush 3 is greatly adversely affected, resulting in seizure between the rear bush 3 and the sleeve yoke 5.

The Invention, FIGS. 4 through 8

The present invention was made to overcome the above problem encountered in the prior art systems for lubricating a rear bush in an extension housing of an automotive transmission, and will be described in detail with reference to FIGS. 4 through 8.

Figure 4:
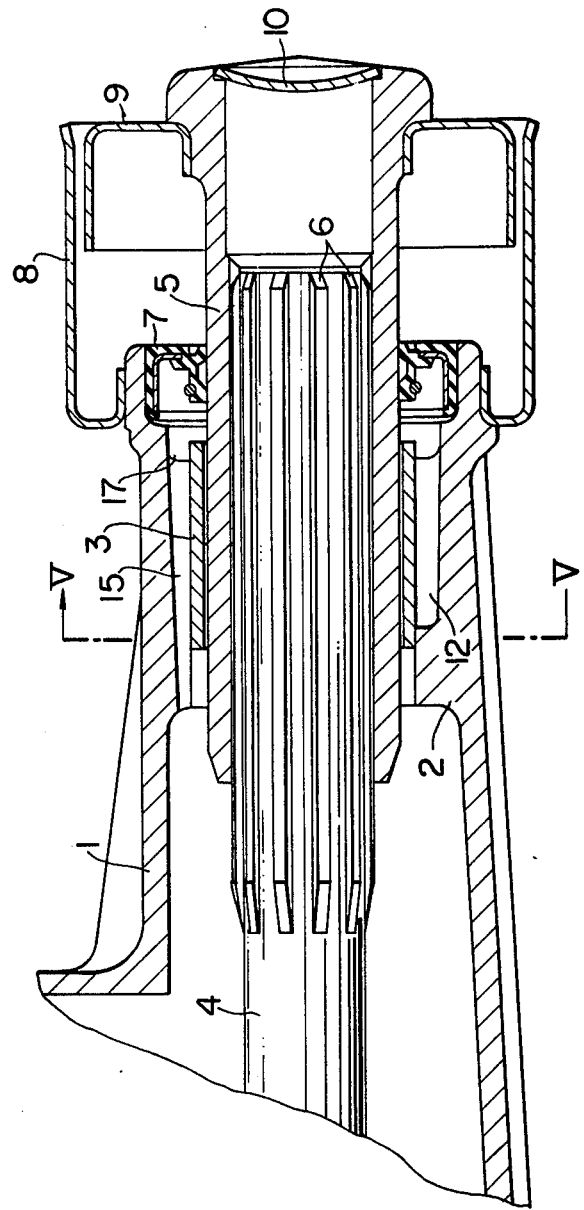
FIG. 4 is a fragmentary longitudinal sectional view of an extension housing of an automotive transmission incorporating a rear bush lubrication system in accordance with the present invention.

A first essential feature of the present invention is that the lower axial passage 12 of the prior art rear bush lubrication system is eliminated as shown in FIG. 5 and the upper axial passages 13 and 14 are located in a position as high as possible. In the preferred embodiment of the present invention only one axial passage 15 having a relatively large cross section is formed in the extension housing 1 immediately above the rear bush as shown in FIGS. 4 and 5. Instead of completely eliminating the axial passage 12, it may be formed as a blind bore opening only at the rear end of the bush 3 as shown in FIG. 4 so that the rear space behind the rear bush 3 may be advantageously increased in volumne as will be described in detail hereinafter.

Figure 6:
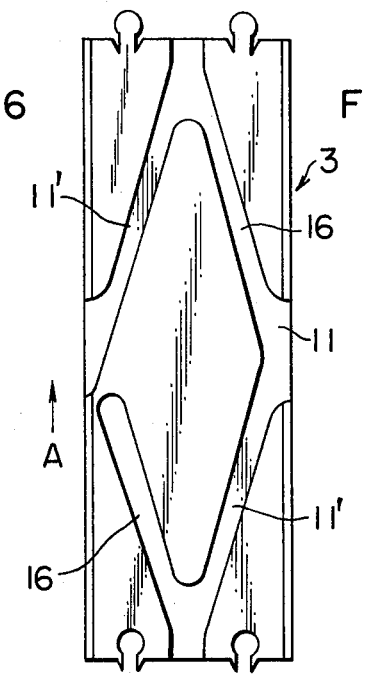
FIG. 6 is a developed view of a rear bush before it is formed into a cylindrical form, illustrating a first embodiment of an oil grooving pattern in accordance with the present invention.

A second essential feature of the present invention is an unique oil grooving pattern which is so formed as to prevent the discharge of lubricating oil into the front space from the oil grooves of the rear bush 3. In FIG. 6 there is shown a first embodiment of an oil grooving pattern in accordance with the present invention. It should be noted that the front end of an oil groove 16 corresponding to the helical oil groove 11" shown in FIG. 2 is terminated adjacent the front end of the rear bush 3. Therefore upon rotation of the sleeve yoke 5, lubricating oil is forced to be drawn into the helical oil groove 11' to flow from the front space to the rear space throughout the helical groove 11' but the lubricant which has been drawn into the helical groove 16 from the rear space is not discharged into the front space.

Figure 7:
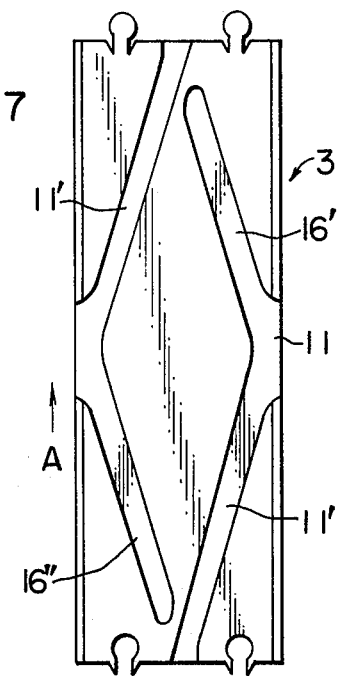
FIG. 7 is a view similar to FIG. 6, but illustrating a second embodiment of an oil grooving pattern in accordance with the present invention.

In FIG. 7 there is shown a second embodiment of an oil grooving pattern in accordance with the present invention. In this embodiment the helical groove 11" shown in FIG. 2 is substituted by two helical grooves 16' and 16" which are interrupted at the middle point between the ends of the rear bush without intersecting the helical groove 11'. Since the groove 16" is out of communication with the rear space, the lubricating oil is not discharged into the front space.

Figure 8:
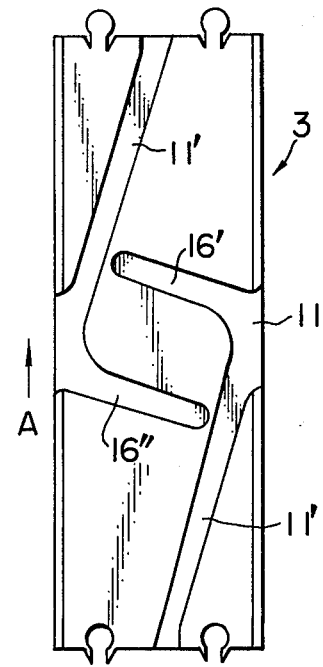
FIG. 8 is a similar view illustrating a modification of the second embodiment shown in FIG. 7.

In FIG. 8 there is shown a modification of the second embodiment shown in FIG. 7. Partly extended oil grooves 16' and 16" are inclined at a relatively greater angle with respect to the rear and front sides, respectively, of the rear bush 3 so that they may be extended over a relatively longer distance in the axial direction of the rear bush 3 and consequently a wider lubrication distribution may be attained.

The oil grooving pattern shown in FIGS. 7 and 8 are symmetrical so that they have an advantage in that in assembly it is not required to take into consideration the direction of the rear bush 3.

According to the present invention as described above, when the vehicle is traveling on a flat road or upgrade slope, the lubricating oil after lubrication of the sliding contact surfaces of the rear bush 3 and the sleeve yoke 5 is discharged only into the rear space and the lubricant discharged into the rear space is returned into the front space through the axial passage 15. When the vehicle is traveling on a down-hill, the lubricant flows toward the transmission case, leaving almost no lubricant just in front of the rear bush 3, but a considerable amount of the lubricant remains in the rear space because an axial passage extending below the rear bush 3 is not provided in accordance with the present invention. The lubricant in the rear space is drawn into the helical groove 16 or 16' to lubricate the sliding contact surfaces. These oil grooves, however, are not communicated with the front space so that the lubricant drawn into them is not discharged into the front space except an extremely small amount of oil leaking through the clearance between the rear bush 3 and the sleeve yoke 5. Therefore the effective lubrication can be attained until all of the lubricant remaining in the rear space leaks through the clearance between the rear bush 3 and the sleeve yoke 5 into the front space. In general, downhill traveling continues 20 minutes at the maximum, and the lubricating oil trapped in the rear space is sufficient in quantity to continue the satisfactory lubrication of the rear bush and sleeve yoke during 20 minutes. When the blind bore 12 is formed as stated hereinbefore, there is an advantage that the lubricant remaining in the rear sapce at the beginning of the down-hill traveling is increased in quantity.

A further arrangement for prolonging the duration of lubrication of the rear space during the down-hill traveling is to extend the rear end of the bush 3 beyond the rear end 17 of the retainer section 2 of the extension housing 1 as shown in FIG. 4. The lubricating oil trapped in the rear space is taken by the sleeve yoke during the down-hill drive to swirl therewith so that an annular layer of oil with a certain thickness is formed around the sleeve yoke. When this swirling lubricant layer extends radially beyond the outer periphery of the rear bush, the lubricating oil flows into the upper axial passage 15 to be discharged into the front space. The lubricating oil splashed upwardly by the sleeve yoke 5 is also discharged through the axial groove 15 into the front space. When the lubricating oil trapped in the rear space is discharged into the front space through the axial passage in the manner described above, the oil for lubricating the rear bush 3 and the sleeve yoke 5 is relatively rapidly decreased in volume, resulting in a shorter lubrication time during the down-hill drive. However when the rear end of the rear bush 3 is extended axially backwardly of the rear end 17 of the retainer section 2 as described above, the inlet of the axial passage 15 is spaced apart from the outer surface of the sleeve 5 by a certain distance so that a substantial amount of the lubricating oil drops before it reaches the inlet of the axial passage 15 and consequently the loss of the lubricating oil discharged through the axial passage 15 may be minimized.

As described above, according to the present invention, the problem of lubrication of a rear bush in an automotive transmission during the down-hill traveling may be overcomed only by the minor modifications of the prior art lubrication systems so that from the practical viewpoint the present invention is very advantageous over the hitherto proposed solutions.

What is claimed is:

1. A rear bushing lubrication device for use in an automotive transmission of the type in which a cylindrical hollow rear bushing having a bore with an inner surface, an upper portion and front and rear ends, with a front space in front of said rear bushing and a rear space behind said rear bushing, and in which said rear bushing is disposed adjacent to the rear end of an extension housing of the automotive transmission for rotatably supporting an output shaft or sleeve which is rotatable in unison with said output shaft, said device comprising:
means defining a plurality of oil grooves in the bore of said rear bushing in such a pattern that upon rotation of said output shaft or sleeve in the direction corresponding to forward gears, lubricating oil is drawn into said oil grooves from the front and rear ends of said rear bushing to be distributed over the whole inner surface of said rear bushing and to be discharged only in the rear space behind said rear bushing, and means defining at least one axial passage in a portion of said extension housing surrounding the upper portion of the rear bushing for intercommunicating said rear space and said front space.

2. A rear bushing lubrication device as set forth in claim 1, in which said oil grooves consist of a first helical oil groove for intercommunicating said front and rear spaces, the direction of said first helical oil groove being same with the direction of rotation of said output shaft, and a second helical oil groove intersecting said first oil groove and having one end communicated with said rear space and the other end terminated at a point spaced apart from the front end of said rear bushing, the direction of said second helical oil groove being opposite to the direction of rotation of said output shaft.

3. A rear bushing lubrication device as set forth in claim 1, in which said oil grooves consist of a first helical oil groove for intercommunicating said front and rear spaces, the direction of said first helical oil groove being same with the direction of rotation of said output shaft, and a pair of symmetrical partly helical oil grooves which are extended from the front and rear ends, respectively, of said rear bushing in the direction opposite to that of said first helical oil groove and terminated at a point adjacent the middle point of said first helical oil groove without intersecting the first oil groove.

4. A rear bushing lubrication device as set forth in claim 3, in which the angle of each of said pair of symmetrical partly helical oil grooves with respect to the respective end of said rear bush is greater than the angle of said first helical oil groove with respect to the respective end of said rear bushing and each of said symmetrical partly helical oil grooves is extended to a point beyond the middle point between the ends of said rear bushing.

5. A rear bushing lubrication device as set forth in claim 1, in which said rear bushing is force fitted into an annular rear bushing retainer section formed integral with and projected radially inwardly from said extension housing in the vicinity thereof, and said only one axial passage is formed in the bore of said rear bushing retainer section along the top of said rear bushing.

6. A rear bushing lubrication device as set forth in claim 5, in which the rear end of said rear bushing is extended rearwardly beyond the rear end of said rear bushing retainer section.

* * * * *